United States Patent
Thompson et al.

(10) Patent No.: US 7,130,931 B2
(45) Date of Patent: Oct. 31, 2006

(54) METHOD, SYSTEM, AND ARTICLE OF MANUFACTURE FOR SELECTING REPLICATION VOLUMES

(75) Inventors: John Glenn Thompson, Tucson, AZ (US); David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 10/464,964

(22) Filed: Jun. 18, 2003

(65) Prior Publication Data

US 2004/0255833 A1    Dec. 23, 2004

(51) Int. Cl.
*G06F 13/16* (2006.01)
(52) U.S. Cl. .......................................... 710/17; 710/16
(58) Field of Classification Search ...................... None
See application file for complete search history.

(56) References Cited

U.S. PATENT DOCUMENTS 4,322,795 A * 3/1982 Lange et al. ................. 711/136
5,422,761 A * 6/1995 Anderson et al. ............. 360/47

FOREIGN PATENT DOCUMENTS

| JP | 60018899 A | * | 1/1985 |
| JP | 11232309 A | * | 8/1999 |

OTHER PUBLICATIONS

G.Castets, et al., "IBM TotalStorage Enterprise Storage Server Implementing ESS Copy Services with IBM eServer zSeries" IBM Corp., International Technical Support Organization, IBM Document No. SG24-5680-01,Apr. 2003, Chapter 1.

* cited by examiner

*Primary Examiner*—B. James Peikari
(74) *Attorney, Agent, or Firm*—Rabindranath Dutta; Konrad Raynes & Victor LLP

(57) ABSTRACT

Provided are a method, system, and article of manufacture for copying storage. A request is received from a host application to copy a plurality of source storage units. A list of potential target storage units is determined based on a policy. Potential target storage units that are eligible for fast replication are selected from the determined list, wherein the selection of the potential target storage units for fast replication includes determining whether a storage unit in the list of potential target storage units is eligible for fast replication by processing an attribute associated with the storage unit.

27 Claims, 5 Drawing Sheets

METHOD, SYSTEM, AND ARTICLE OF MANUFACTURE FOR SELECTING REPLICATION VOLUMES

BACKGROUND OF THE INVENTION

1. Field of the Invention

The present invention relates to a method, system, and an article of manufacture for selecting replication volumes.

2. Description of the Related Art

Data in information technology systems, including storage systems, may need to be replicated for a variety of reasons, such as, for data migration, data backup, data duplication etc. Such replication or copying of data may involve interactions among hosts, storage systems and connecting networking components of the information technology system.

An enterprise storage server (ESS), such as the IBM* TOTALSTORAGE ENTERPRISE STORAGE SERVER*, may be a disk storage server that includes one or more processors coupled to storage devices, including high capacity scalable storage devices, Redundant Array of Independent Disks (RAID), etc. The enterprise storage servers are connected to a network and include features for copying data in storage systems.

Enterprise storage servers (ESS) may include replication functions for copying data either locally, i.e., within the same ESS, or remotely, i.e., copying data to a separate ESS. Implementations may replicate data between a set of source volumes and a corresponding set of target volumes in one or more enterprise storage servers. In certain enterprise storage servers there may be fast replication functions, such as, FLASHCOPY*, that copies ESS volumes. The fast replication functions may copy ESS volumes with minimal interruption to applications, and may make it possible to access both the source and target copies substantially immediately. Both the source and the target volumes may reside on the same ESS system, although implementations may be possible where the source and target volumes reside on different ESS systems. In many implementations, volumes that are eligible for fast replication may have special features. Further details of fast replication techniques, such as, FLASHCOPY*, are described in the IBM publication "IBM TotalStorage Enterprise Storage Server: Implementing ESS Copy Services with IBM eServer zSeries," IBM document no. SG24-5680-01 (Copyright IBM, 2003), which publication is incorporated herein by reference in its entirety.

SUMMARY OF THE PREFERRED EMBODIMENTS

Provided are a method, system, and article of manufacture for copying storage. A request is received from a host application to copy a plurality of source storage units. A list of potential target storage units is determined based on a policy. Potential target storage units that are eligible for fast replication are selected from the determined list, wherein the selection of the potential target storage units for fast replication includes determining whether a storage unit in the list of potential target storage units is eligible for fast replication by processing an attribute associated with the storage unit.

In further implementations, the plurality of source storage units are copied via fast replication to the selected potential target storage units.

In additional implementations, for those potential target storage unit ineligible for fast replication, a reason for ineligibility for fast replication is saved. In further implementations, the saved reason for ineligibility for fast replication is returned to the host application, wherein the returned reason for ineligibility is accessible to a user.

In additional implementations, the policy is provided by a user, wherein receiving the request, determining the list of potential target storage units, and selecting potential target storage units are performed by a fast replication application coupled to the host, and wherein the fast replication application queries a device management utility to determine whether the storage unit in the list of potential target storage units is eligible for fast replication.

The implementations provide a solution to a manageability problem for fast replication by limiting the number of volumes that need to be interrogated and considered for selection as a target volume for fast replication. Furthermore, the implementations provide a solution to a serviceability problem for fast replication, because if the interrogated volumes are not eligible for fast replication the reasons are recorded and returned to the host system.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
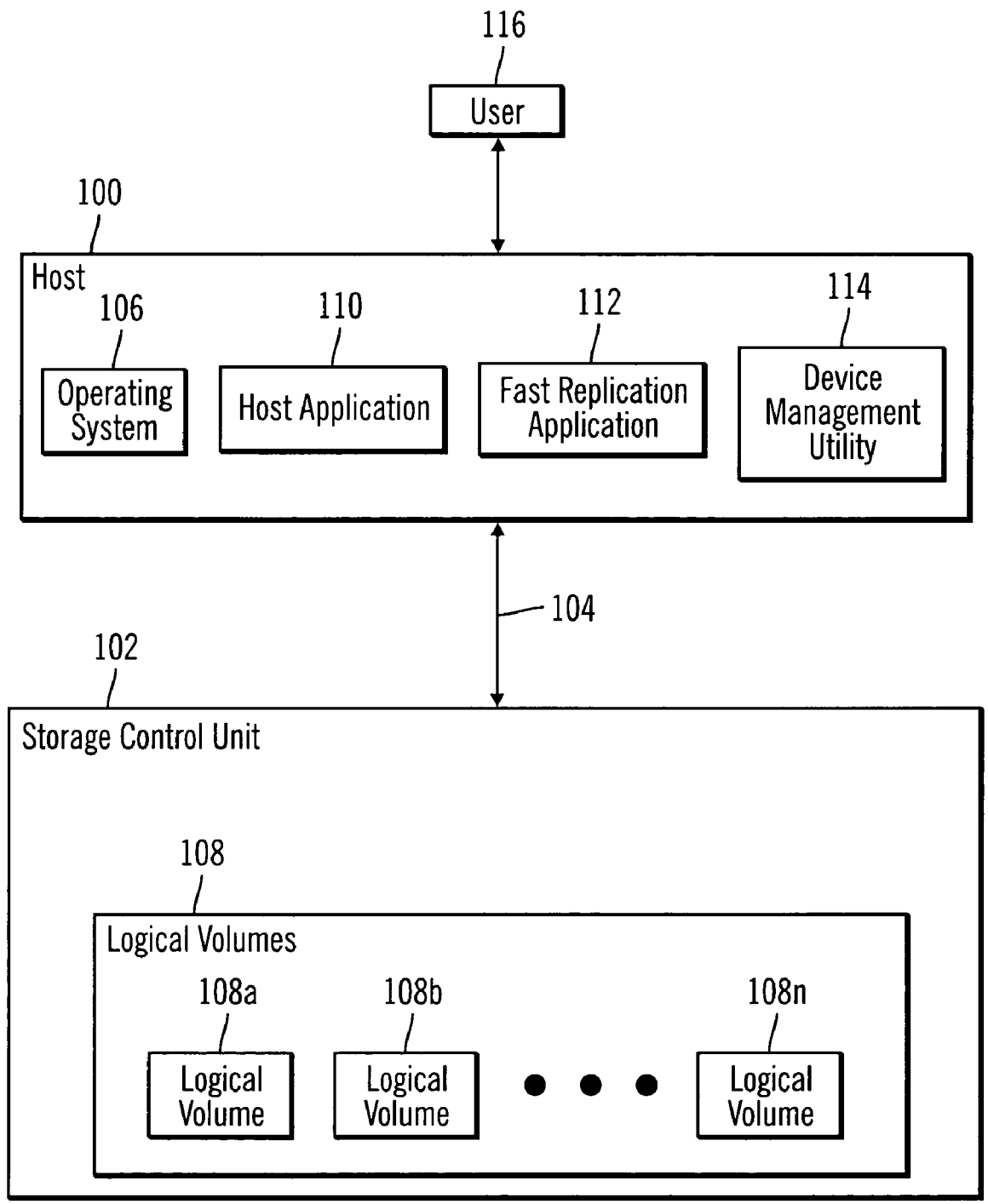
FIG. 1 illustrates a block diagram of a computing environment, in accordance with certain described aspects of the invention.

In the following description, reference is made to the accompanying drawings which form a part hereof and which illustrate several implementations. It is understood that other implementations may be utilized and structural and operational changes may be made without departing from the scope of the present implementations.

Selecting Volumes for Fast Replication

A host application may request a copy operation on certain source logical volumes in a storage control unit. A fast replication application in the storage control unit may first determine a list of acceptable target volumes for the copy operation by determining which logical volumes in the storage control unit are acceptable target volumes, based on where the host application wants the data to be copied to. The determination may be made by using "user-specified" volumes that the host application specifies for the copy operation or by using "user-specified" volumes determined from "user-specified" policies that define the acceptable target volumes for the copy operation.

The fast replication application may determine a list of eligible fast replication volumes based on the capabilities of the disk subsystem in which the data resides and the current disposition of the volumes. For example, some storage control units may be capable of performing fast replication only within logical subsystems and some storage control units may be capable of performing fast replication across logical subsystems, where the volumes in a storage control unit may be distributed across one or more logical subsystems. Some storage control units may be able to perform fast replication to logical volumes that are already involved in another type of copy function, like PEER TO PEER REMOTE COPY (PPRC)* or FLASHCOPY* , whereas some storage control units may not be able to perform such operations.

After determining the list of eligible fast replication volumes, the fast replication application then selects volumes that appear on both lists, i.e., volumes that are common to the "user-specified" volumes and the fast replication eligible volumes. The selected volumes that appear on both lists may be referred to as fast replication volumes, and the fast replication volumes may be used as target logical volumes for fast replication of the source logical volumes. In certain implementations, the selection of the volumes may be performed in a software component which could be considered part of the fast replication application, or as a separate component. Furthermore, the selection may be performed in the storage control unit, the fast replication application, or some other independent component, There is a manageability problem with the above technique of selecting fast replication volumes. As the number of subsystems in a storage control unit are enhanced, the number of volumes that are eligible for fast replication increases, making it difficult to manage the list of volumes that are eligible for fast replication for a given copy operation. The ability to perform fast replication across logical subsystems and the increasing number of volumes in each subsystem of a storage control unit contribute to the increasing difficulty in managing the list of eligible fast replication volumes in the storage control unit.

There is also a serviceability problem associated with the above technique. In the above technique, as volumes are interrogated to determine if the volumes are eligible for fast replication for a given copy operation, no information is maintained regarding the reason that a volume(s) is ineligible. Therefore, no information on the ineligibility of volumes is returned to the host application. Therefore, it is difficult for a user to determine why fast replication was not performed for a particular requested copy operation.

Fast Replication of Volumes

FIG. 1 illustrates a computing environment utilizing a host 100 coupled to a storage control unit 102. While only a single host 100 is shown coupled to a single storage control unit 102, in certain alternative implementations of the invention a plurality of hosts may be coupled to a plurality of storage control units. The host 100 may connect to the storage control unit 102 through a host data interface 104 channel, such as the ENTERPRISE SYSTEM CONNECTION (ESCON)* channel or any other data interface mechanism known in the art (e.g., fibre channel, Storage Area Network (SAN) interconnections, etc.). The host 100 may be any computational device known in the art, such as a personal computer, a workstation, a server, a mainframe, a hand held computer, a palm top computer, a telephony device, network appliance, etc. The host 100 may include any operating system 106 known in the art, such as, the IBM OS/390* or the zOS* operating system.

The storage control unit 102 includes a plurality of logical volumes 108, including logical volumes 108a . . . 108n. In certain implementations of the invention, the logical volumes 108 may be distributed among a plurality of logical subsystems (not shown) in a manner known in the art.

The storage control unit 102 controls a plurality of physical storage devices (not shown), each of which may include one or more physical volumes (not shown). The physical storage devices may include any physical storage devices known in the art, such as, Direct Access Storage Devices (DASD), Just a Bunch of Disks (JBOD), Redundant Array of Inexpensive Disks (RAID), etc. The storage control unit 102 maps the physical volumes into to the plurality of logical volumes 108. The host 100 may address the storage control unit 102 and perform operations, such as, read, write, copy, etc., with respect to a logical volume 108a . . . 108n.

In addition to the operating system 106, the host 100 many include a host application 110, a fast replication application 112, and a device management utility 114. The host application 110 may request the fast replication application 112 to copy via fast replication a plurality of source logical volumes included in the logical volumes 108. The fast replication application 112 may request the storage control unit 102 to perform the fast replication of the source logical volumes indicated by the host application 110.

The device management utility 114 keeps track of the characteristics of the devices coupled to the host 100. For example, the device management utility 114 may keep track of the characteristics of the storage control unit 102, the logical volumes 108, and the associated logical subsystems in the storage control unit 102. The characteristics that the device management utility 114 tracks may include attributes of the logical volumes 108. For example, the device management utility may track whether the logical volumes 108a . . . 108n are eligible for fast replication, where eligibility for fast replication is an attribute of a logical volume. The device management utility 114 may provide these tracked characteristics to the fast replication application 112.

A user 116 may interact with the host 100 by initiating applications, such as the host application 110, on the host 100. The user 116 may also specify policies that are used by the fast replication application 112.

Therefore, FIG. 1, illustrates a computing environment where the host application 110 sends a fast replication request to the fast replication application 112, and in response the fast replication application 112 may request the storage control unit 102 to perform a fast replication of the source volumes indicated in the fast replication request. The fast replication application 112 may satisfy the fast replication request by using policies specified by the user 116 in combination with characteristics of specific volumes obtained from the device management utility 114.

Figure 2:
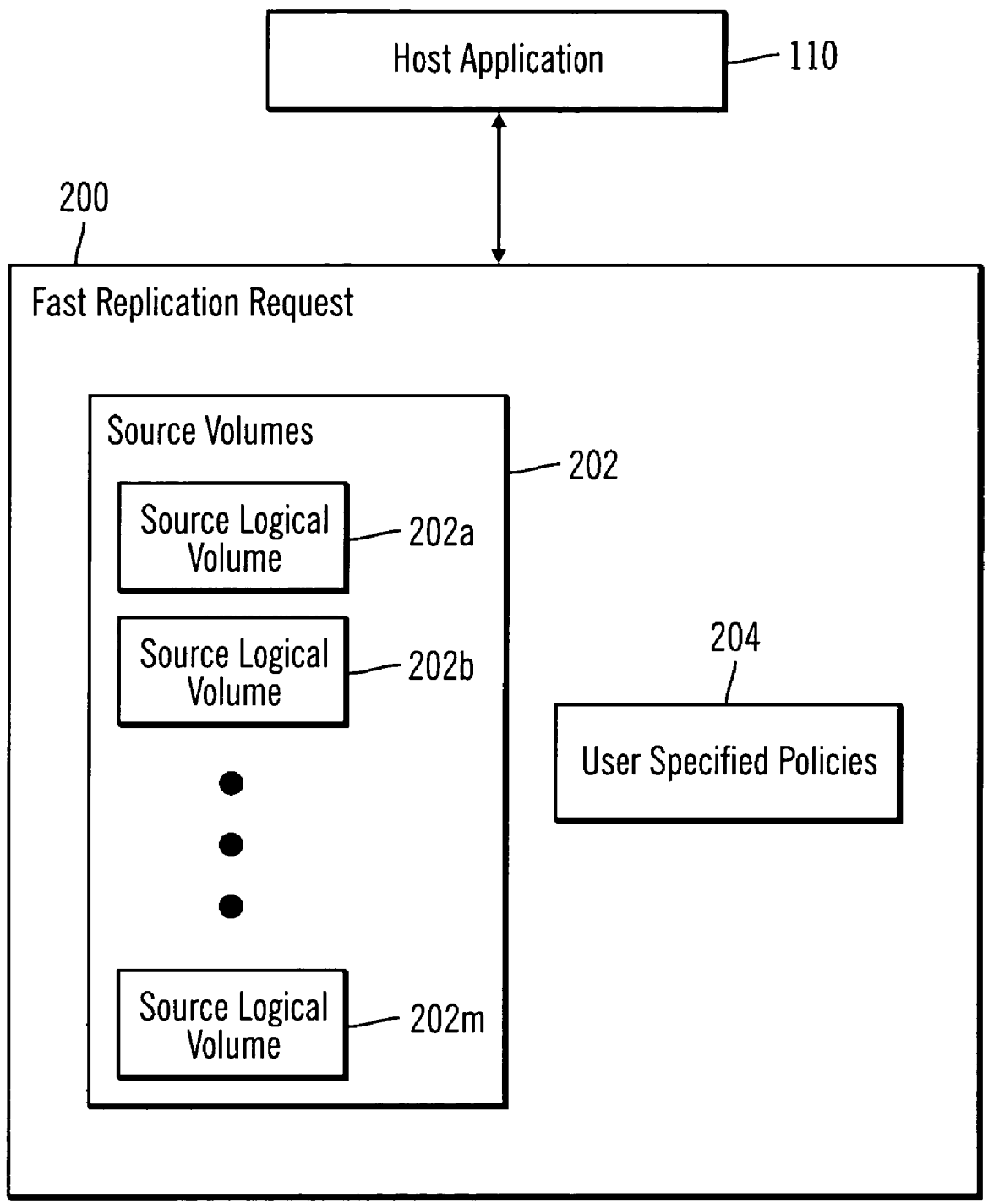
FIG. 2 illustrates a block diagram of a host application, in accordance with certain described implementations of the invention.

FIG. 2 illustrates a block diagram of the host application 110 implemented in the host 100, in accordance with certain implementations of the invention. The host application 110 may send a fast replication request 200 to the fast replication application 112, where the fast replication request 200 is a request to perform a fast replication of the source volumes 202, such as, source volumes 202a . . . 202m, where the logical volumes 108 in the storage control unit 102 include the source volumes 202. The host application 110 may also send or inform the location of user specified policies 204 that are created by the user 116, where a list of target volumes for fast replication of the source volumes 202 may be determined from the user specified policies 204. The target volumes in the list of target volumes for fast replication are from the logical volumes 108 in the storage control unit 102.

Therefore, FIG. 2 illustrates how the host application 110 sends the fast replication request 200 to the fast replication application 112, where the fast replication request 200 includes the source volumes 202 to be replicated and the user specified policies 204 for determining the target volumes to which the source volumes 202 are to fast replicated. In certain alternative implementations, the user specified policies 204 are stored in the host 102 by the user 116 and the host application 110 does not have to send the user specified policies 204.

Figure 3A:
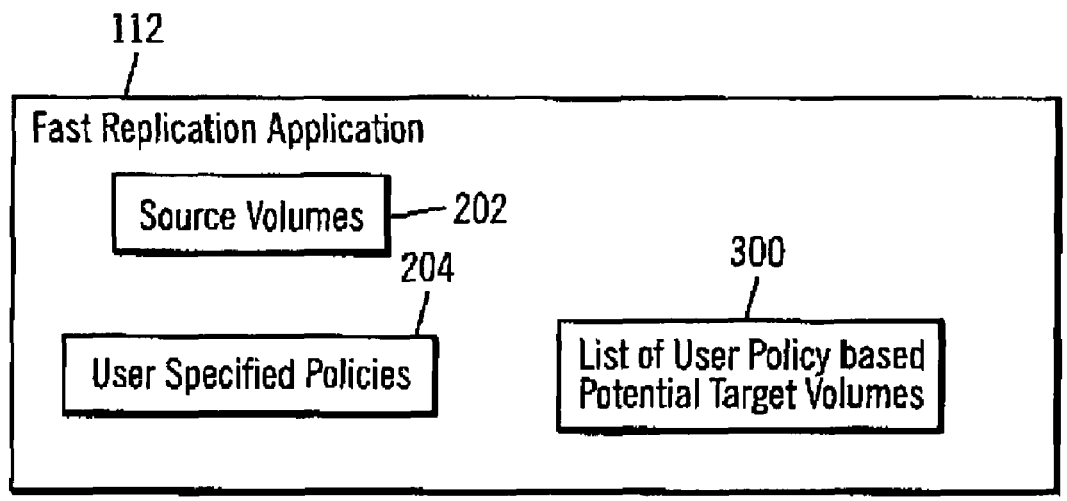
FIG. 3A illustrates a block diagram of a fast replication application, in accordance with certain described implementations of the invention.

FIG. 3A illustrates a block diagram of the fast replication application 112 implemented in the host 100, in accordance with certain implementations of the invention. Coupled to the fast replication application 112 are the source volumes 202, the user specified policies 204, and a list of user policy based potential target volumes 300.

The list of user policy based potential target volumes 300 is a set of target volumes that may be determined from the user specified policies 204. In certain implementations, the user specified policies 204 sent by the host application 110 may indicate the potential target volumes to be included in the list of user policy based potential target volumes 300. In other implementations, the user specified policies 204 may have to be analyzed by the fast replication application 112 to determine the potential target volumes in the list of user policy based potential target volumes 300. In alternative implementations of the invention, the user specified policies 204 may be created by the user 116 and stored in the host 100 for extraction by the fast replication application 112.

Therefore FIG. 3A illustrates how the fast replication application 112 in the host 100 generates or stores a list of user policy based potential target volumes 300 determined from the user specified policies 204. The fast replication application 112 may query the device management utility 114 to determine whether a potential target volume in the list of user policy based potential target volumes 300 is eligible for fast replication.

Figure 3B:
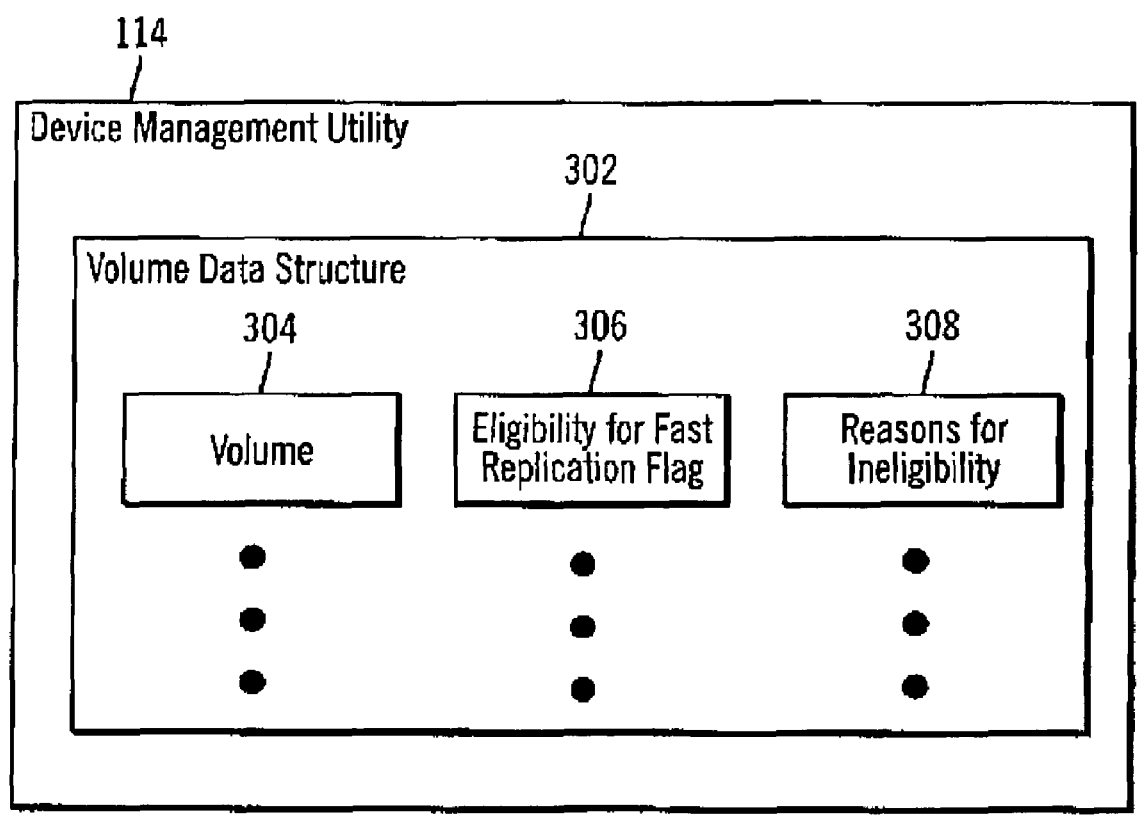
FIG. 3B illustrates a block diagram of a device management utility, in accordance with certain described implementations of the invention.

FIG. 3B illustrates a block diagram of the device management utility 114 implemented in the host 100, in accordance with certain implementations of the invention. Coupled to the device management utility 114 is a volume data structure 302.

The volume data structure 302 includes for a plurality of volumes in the logical volumes 108, a first attribute, such as, an eligibility for fast replication flag 306 and a second attribute, such as, reasons for ineligibility 308 field. For example, an exemplary volume 304 may have a corresponding eligibility for fast replication flag 306 and a reasons for ineligibility 308 field. The device management utility 114 may update the volume data structure 302, in response to a change in the status of logical volumes 108 in the storage control unit 102. In certain implementations, the device management utility 114 may generate the volume data structure for a specific volume or a specific set of volumes, at the request of the fast replication application 112. For example, in certain implementations the logical volume 108a may become the source of another copy operation and become ineligible as a target volume for fast replication and the volume data structure 302 may be updated by the storage control unit 102 to reflect this information. In another example, the fast replication application 112 may request the eligibility status of a specific volume for fast replication to the device management utility 112, and the device management utility 114 may determine the eligibility status and return the eligibility status to the fast replication application 112.

If the eligibility for fast replication flag 306 is true then the corresponding volume 304 is eligible for fast replication. If the eligibility for fast replication flag 306 is false, then the corresponding reasons for ineligibility 308 field may indicate why the corresponding volume 304 is ineligible for fast replication. To provide a non-limiting example, in certain implementations a volume 304 may be ineligible for fast replication because the volume 304 is the source volume for another copy operation.

Therefore, FIG. 3B illustrates how the device management utility 114 in the host 110, generates or stores the eligibility of volumes for fast replication and the reasons for ineligibility of volumes for fast replication in the volume data structure 302.

Figure 4:
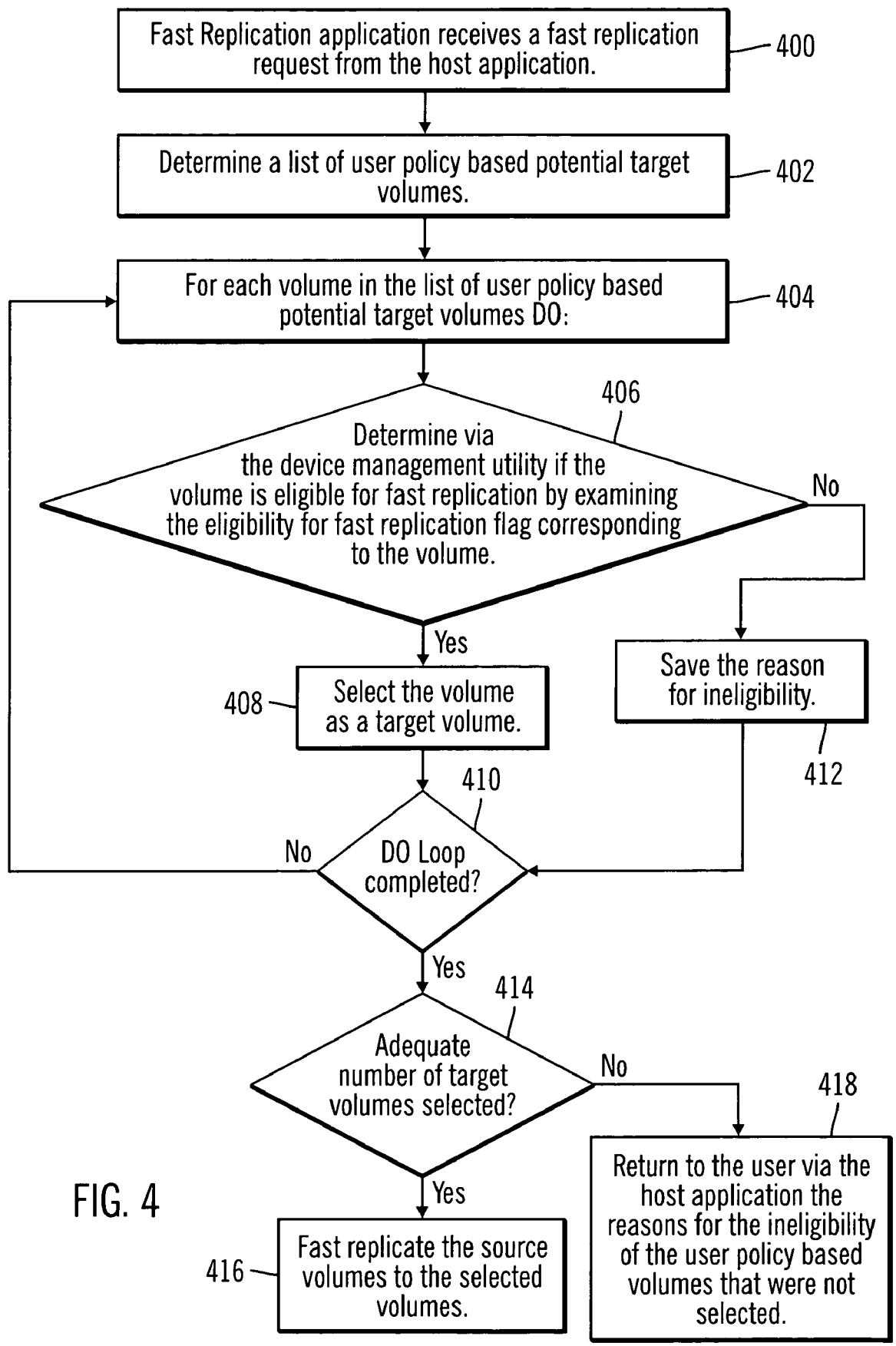
FIG. 4 illustrates logic for fast replication, in accordance with certain described implementations of the invention.

FIG. 4 illustrates logic for fast replication, in accordance with certain implementations of the invention. The logic is implemented via the fast replication application 112 in the host 100.

Control starts at block 400, where the fast replication application 112 receives a fast replication request 200 from the host application 110. The fast replication request 200 may include the source volumes 202 and indicate the user specified policies 204 for determining target volumes for fast replication. In certain implementations, the user specified policies 204 are stored in the host 100 by the user 116 and the fast replication request 200 may not need to indicate the user specified policies 204.

The fast replication application 112 determines (at block 402) the list of user policy based potential target volumes 300 by analyzing the user specified policies 204. The fast replication application 112 starts a (at block 404) DO loop, where for each volume in the list of user policy based potential target volumes 300 the fast replication application 112 performs the operations included in the body of the DO loop. Since the number of volumes in the list of user policy based potential target volumes 300 may be considerably less than the number of logical volumes 108 in the storage control unit 102, the DO loop needs to be executed only a limited number of times when compared to examining all logical volumes capable of acting as a target volume for fast replication.

The fast replication application 112 determines (at block 406) if the volume is eligible for fast replication by examining the eligibility for fast replication flag, such as, the eligibility for fast replication flag 306, corresponding to the volume in the volume data structure 302. To make the determination, the fast replication application 112 requests the device management utility 114 for the eligibility for fast replication flag 306 corresponding to the volume, where the eligibility for fast replication flag 306 corresponding to the volume is stored or generated by the device management utility 114. If the volume is ineligible for fast replication the device management utility 114 also returns the reasons for ineligibility 308 field to the fast replication application 112. If the volume is eligible for fast replication, then the fast replication application 112 selects (at block 408) the volume as a target volume for the fast replication. The fast replication application determines (at block 410) if the DO loop is completed. If not, execution of the DO loop continues (at block 404).

If the volume is determined (at block 406) to be ineligible for fast replication, then the fast replication application 112 saves (at block 412) the reasons for ineligibility extracted from the reasons for ineligibility field, such as, the reasons for ineligibility 308 field, corresponding to the volume in the volume data structure 302. The fast replication application 112 determines (at block 410) if the DO loop is completed.

If the fast replication application 112 determines (at block 410) that the DO loop is completed then the fast replication application determines (at block 414) if an adequate number of target volumes have been selected for fast replication of the source volumes. If so, the fast replication application 112 fast replicates the sources volumes to the selected target volumes. If not, the fast replication application 112 returns (at block 418) to the user 116 via the host application 110 the reasons for the ineligibility of the user policy based volumes that were not selected. Therefore, the fast replication application 112 makes the user 116 aware of the reasons why the fast replication request 200 could not be satisfied.

Therefore, FIG. 4 illustrates how the fast replication application 112 by utilizing the user specified policies 204 and the device management utility 114 reduces the number of volumes to interrogate to select the target volumes that are eligible for fast replication. The fast replication application 112 limits the number of volumes by interrogating via the device management utility 114 only those volumes in the list of user policy based potential target volumes 300, where the list of user policy based potential target volumes 300 is determined from the user specified policies 204 received from the host application 110. Furthermore, FIG. 4 illustrates how the fast replication application makes the host application 110 aware of the reasons why the fast replication request 200 could not be satisfied.

The implementations provide a solution to a manageability problem for fast replication by limiting the number of volumes that needs to be interrogated and considered for selection as a target volume for fast replication. The implementations of the invention do not have to interrogate all volumes in the storage control unit that could potentially be used for fast replication. Furthermore, the implementations provide a solution to a serviceability problem because as volumes are interrogated, if the volumes are not eligible for fast replication then the reasons are noted and returned to the host system.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 5:
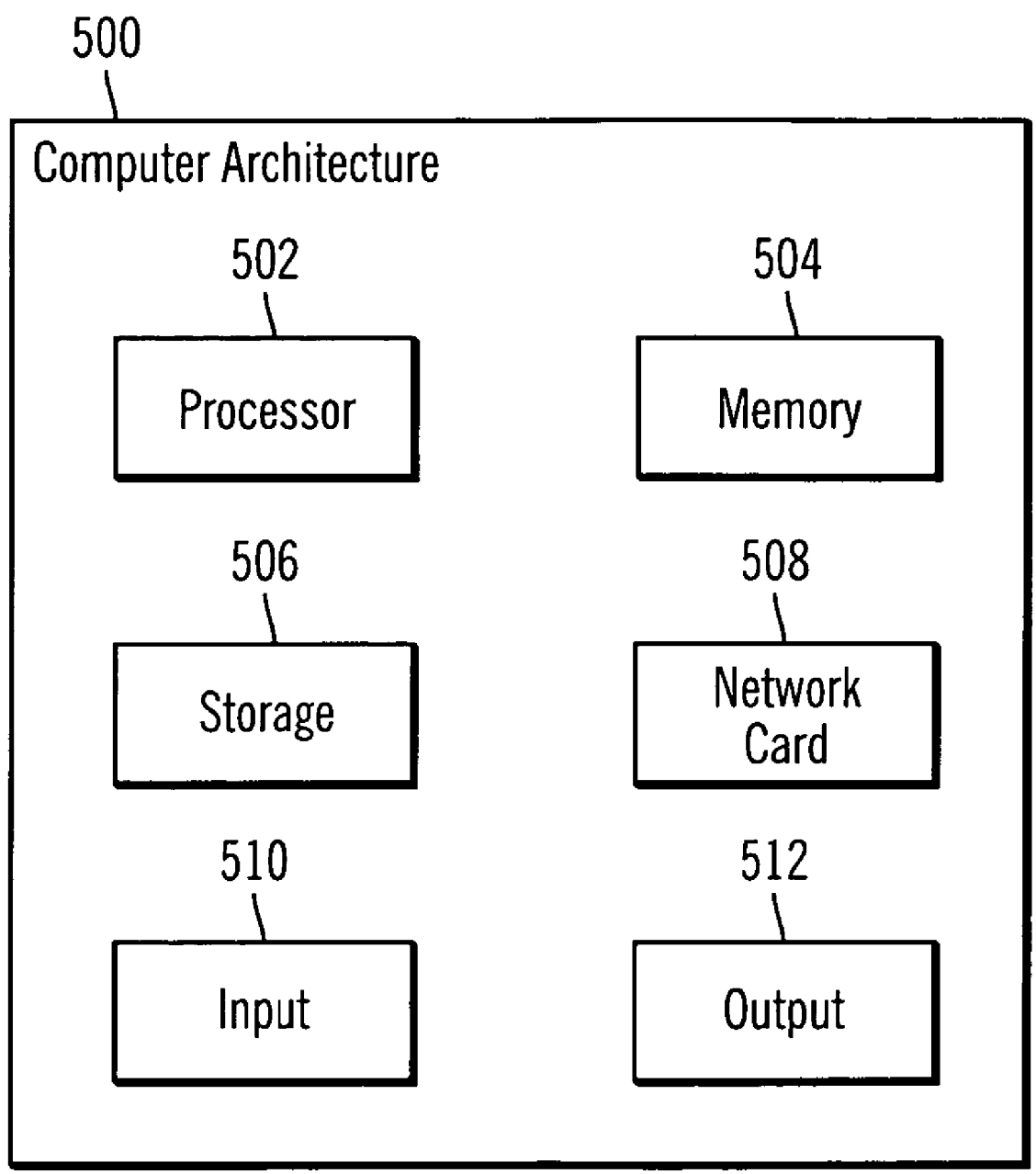
FIG. 5 illustrates a block diagram of a computer architecture in which certain described aspects of the invention are implemented.

FIG. 5 illustrates a block diagram of a computer architecture in which certain aspects of the invention are implemented. FIG. 5 illustrates one implementation of the host 100, and the storage control unit 102. The host 100 and the storage control unit 102 may implement a computer architecture 500 having a processor 502, a memory 504 (e.g., a volatile memory device), and storage 506 (e.g., a non-volatile storage, magnetic disk drives, optical disk drives, tape drives, etc.). The storage 506 may comprise an internal storage device, an attached storage device or a network accessible storage device. Programs in the storage 506 may be loaded into the memory 504 and executed by the processor 502 in a manner known in the art. The architecture may further include a network card 508 to enable communication with a network. The architecture may also include at least one input 510, such as a keyboard, a touchscreen, a pen, voice-activated input, etc., and at least one output 512, such as a display device, a speaker, a printer, etc.

The logic of FIG. 4 describes specific operations occurring in a particular order. Further, the operations may be performed in parallel as well as sequentially. In alternative implementations, certain of the logic operations may be performed in a different order, modified or removed and still implement implementations of the present invention. Morever, steps may be added to the above described logic and still conform to the implementations. Yet further steps may be performed by a single process or distributed processes.

Many of the software and hardware components have been described in separate modules for purposes of illustration. Such components may be integrated into a fewer number of components or divided into a larger number of components. Additionally, certain operations described as performed by a specific component may be performed by other components. For example, certain functions of the storage control unit may be performed by the replication application and vice versa. Furthermore, in addition to storage volumes any type of storage unit known in the art may be used in the implementations.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

*IBM, IBM TOTALSTORAGE ENTERPRISE STORAGE SERVER, ENTERPRISE SYSTEM CONNECTION (ESCON), OS/390, zOS, PEER TO PEER REMOTE COPY (PPRC), FLASHCOPY are trademarks of International Business Machines Corp.

What is claimed is:

1. A method for copying stored data, comprising:
   receiving a request from a host application to copy data stored on a plurality of source storage units;
   determining a list of potential target storage units based on a policy;
   selecting potential target storage units that are eligible for fast replication from the determined list, wherein the selection of the potential target storage units for fast replication includes determining whether a storage unit in the list of potential target storage units is eligible for fast replication by processing an attribute associated with the storage unit; and for those potential target storage unit ineligible for fast replication, saving a reason for ineligibility for fast replication.

2. The method of claim 1, further comprising:
copying via fast replication the data stored on the plurality of source storage units to the selected potential target storage units.

3. The method of claim 1, further comprising:
returning to the host application the saved reason for ineligibility for fast replication, wherein the returned reason for ineligibility is accessible to a user.

4. The method of claim 1, wherein the policy is created by a user and is for determining the list of potential target storage units.

5. The method of claim 1, wherein the host application is implemented in a host, wherein the host is coupled to a storage control unit, and wherein the source storage units and the target storage units are coupled to the storage control unit, and wherein the attribute indicates eligibility for fast replication.

6. A method for copying stored data, comprising:
receiving a request from a host application to copy data stored on a plurality of source storage units;
determining a list of potential target storage units based on a policy; and
selecting potential target storage units that are eligible for fast replication from the determined list, wherein the selection of the potential target storage units for fast replication includes determining whether a storage unit in the list of potential target storage units is eligible for fast replication by processing an attribute associated with the storage unit, and wherein the attribute is a fast replication flag.

7. The method of claim 6, wherein the storage units are storage volumes, and wherein selecting potential target storage units further comprises:
for each storage volume in the list of potential target storage units:
(i) reading the fast replication flag corresponding to the storage volume; and
(ii) if the storage volume has the fast replication flag enabled, selecting the storage volume as suitable for fast replication.

8. The method of claim 6, wherein the source storage units and the target storage units are logical volumes, and wherein the logical volumes are included in one or more storage control units.

9. The method of claim 6, wherein the policy is provided by a user, wherein receiving the request, determining the list of potential target storage units, and selecting potential target storage units are performed by a fast replication application implemented in the host, and wherein the fast replication application queries a device management utility to determine whether the storage unit in the list of potential target storage units is eligible for fast replication.

10. A system for copying stored data, comprising:
a plurality of source storage units;
means for receiving a request from a host application to copy data stored on the plurality of source storage units;
means for determining a list of potential target storage units based on a policy;

means for selecting potential target storage units that are eligible for fast replication from the determined list, wherein the selection of the potential target storage units for fast replication includes determining whether a storage unit in the list of potential target storage units is eligible for fast replication by processing en attribute associated with the storage unit; and means for saving a reason for ineligibility for fast replication for those potential target storage unit ineligible for fast replication.

11. The system of claim 10, further comprising:
means for copying via fast replication the data stored on the plurality of source storage units to the selected potential target storage units.

12. The system of claim 10, further comprising:
means for returning to the host application the saved reason for ineligibility for fast replication, wherein the returned reason for ineligibility is accessible to a user.

13. The system of claim 10, wherein the policy is created by a user and is for determining the list of potential target storage units.

14. The system of claim 10, wherein the host application is implemented in a host, wherein the host is coupled to a storage control unit, and wherein the source storage units and the target storage units are coupled to the storage control unit, and wherein the attribute indicates eligibility for fast replication.

15. A system for copying stored data, comprising:
a plurality of source storage units;
means for receiving a request from a host application to copy data stored on the plurality of source storage units;
means for determining a list of potential target storage units based on a policy;
means for selecting potential target storage units that are eligible for fast replication from the determined list, wherein the selection of the potential target storage units for fast replication includes determining whether a storage unit in the list of potential target storage units is eligible for fast replication by processing an attribute associated with the storage unit, and wherein the attribute is a fast replication flag.

16. The system of claim 15, wherein the storage units are storage volumes, and wherein the means for selecting potential target storage units further performs:
for each storage volume in the list of potential target storage units:
(i) reading the fast replication flag corresponding to the storage volume; and
(ii) if the storage volume has the fast replication flag enabled, selecting the storage volume as suitable for fast replication.

17. The system of claim 15, wherein the source storage units and the target storage units are logical volumes, and wherein the logical volumes are included in one or more storage control units.

18. The system of claim 15, further comprising:
a device management utility; and
a fast replication application coupled to the device management utility, wherein the policy is provided by a user, wherein receiving the request, determining the list of potential target storage units, and selecting potential target storage units are performed by the fast replication application implemented in the host, and wherein the fast replication application queries the device management utility to determine whether the storage unit in the list of potential target storage units is eligible for fast replication.

19. An article of manufacture for copying stored data, wherein the article of manufacture is capable of causing operations, the operations comprising:

receiving a request from a host application to copy data stored on a plurality of source storage units;

determining a list of potential target storage units based on a policy; and selecting potential target storage units that are eligible for fast replication from the determined list, wherein the selection of the potential target storage units for fast replication includes determining whether a storage unit in the list of potential target storage units is eligible for fast replication by processing an attribute associated with the storage unit; and for those potential target storage unit ineligible for fast replication, saving a reason for ineligibility for fast replication.

20. The article of manufacture of claim 19, the operations further comprising:

copying via fast replication the data stored on the plurality of source storage units to the selected potential target storage units.

21. The article of manufacture of claim 19, the operations further comprising:

returning to the host application the saved reason for ineligibility for fast replication, wherein the returned reason for ineligibility is accessible to a user.

22. The article of manufacture of claim 19, wherein the policy is created by a user and is for determining the list of potential target storage units.

23. The article of manufacture of claim 19, wherein the host application is implemented in a host, wherein the host is coupled to a storage control unit, and wherein the source storage units and the target storage units are coupled to the storage control unit, and wherein the attribute indicates eligibility for fast replication.

24. An article of manufacture for copying stored data, wherein the article of manufacture is capable of causing operations, the operations comprising:

receiving a request from a host application to copy data stored on a plurality of source storage units;

determining a list of potential target storage units based on a policy; and selecting potential target storage units that are eligible for fast replication from the determined list, wherein the selection of the potential target storage units for fast replication includes determining whether a storage unit in the list of potential target storage units is eligible for fast replication by processing an attribute associated with the storage unit, and wherein the attribute is a fast replication flag.

25. The article of manufacture of claim 24, wherein the storage units are storage volumes, and wherein selecting potential target storage units further comprises:

for each storage volume in the list of potential target storage units:

(i) reading the fast replication flag corresponding to the storage volume; and (ii) if the storage volume has the fast replication flag enabled, selecting the storage volume as suitable for fast replication.

26. The article of manufacture of claim 24, wherein the source storage units and the target storage units are logical volumes, and wherein the logical volumes are included in one or more storage control units.

27. The article of manufacture of claim 24, wherein the policy is provided by a user, wherein the receiving the request, determining the list of potential target storage units, and selecting potential target storage units are performed by a fast replication application implemented in the host, and wherein the fast replication application queries a device management utility to determine whether the storage unit in the list of potential target storage units is eligible for fast replication.

\* \* \* \* \*